United States Patent
Chang et al.

(10) Patent No.: US 8,165,577 B2
(45) Date of Patent: Apr. 24, 2012

(54) PILOT SIGNAL TRANSMISSION MANAGEMENT

(75) Inventors: Henry Chang, San Diego, CA (US); Doug Dunn, Chula Vista, CA (US)

(73) Assignee: Kyocera Corporation, Kyoto (JP)

( * ) Notice: Subject to any disclaimer, the term of this patent is extended or adjusted under 35 U.S.C. 154(b) by 531 days.

(21) Appl. No.: 12/407,707

(22) Filed: Mar. 19, 2009

(65) Prior Publication Data

US 2010/0240314 A1    Sep. 23, 2010

(51) Int. Cl.
*H04B 7/185* (2006.01)
*H04B 7/00* (2006.01)

(52) U.S. Cl. ......... 455/423; 455/436; 455/502; 455/517

(58) Field of Classification Search ............... 455/422.1, 455/423, 436, 453, 517, 552, 502, 503
See application file for complete search history.

(56) References Cited

U.S. PATENT DOCUMENTS

| | | | |
|---|---|---|---|
| 4,737,978 A | 4/1988 | Burke et al. | |
| 5,208,756 A | 5/1993 | Song | |
| 5,293,645 A | 3/1994 | Sood | |
| 6,011,974 A | 1/2000 | Cedervall et al. | |
| 6,414,635 B1 | 7/2002 | Stewart et al. | |
| 6,434,367 B1 | 8/2002 | Kumar et al. | |
| 696,558 A1 | 11/2005 | Grilli at el. | |
| 6,990,324 B2 | 1/2006 | Laroia et al. | |
| 7,019,663 B2 | 3/2006 | Sharony | |
| 7,050,819 B2 | 5/2006 | Schewengler et al. | |
| 7,167,712 B2 | 1/2007 | Ogino et al. | |
| 7,260,399 B1 | 8/2007 | Oh et al. | |
| 7,286,834 B2 | 10/2007 | Walter | |
| 7,339,909 B2 | 3/2008 | Kotzin | |
| 7,433,673 B1 | 10/2008 | Everson et al. | |
| 753,949 A1 | 5/2009 | Holur et al. | |
| 7,610,049 B2 | 10/2009 | Watanabe | |
| 7,933,619 B2 * | 4/2011 | Kim .............................. 455/515 |
| 2003/0118015 A1 | 6/2003 | Gunnarsson et al. | |
| 2004/0014477 A1 | 1/2004 | Ishiguro et al. | |
| 2004/0051664 A1 | 3/2004 | Frank | |
| 2004/0090937 A1 | 5/2004 | Chaskar et al. | |

(Continued)

FOREIGN PATENT DOCUMENTS

EP    0504122    9/1992

(Continued)

OTHER PUBLICATIONS http://www.eetasia.com/ART_8800531130_499495_NP_daceb3a3.HTM Title: Baseband processors lower BOM in femtocell apps.

(Continued)

*Primary Examiner* — Don Le

(57) ABSTRACT

A base station is configured to reduce interference with other base stations and/or devices in a multi-cell wireless network. The base station includes a wireless interface, detector and controller. To reduce interference, the wireless interface may provide services to a first wireless communication device (WCD) using a pilot signal emitted from the base station at a reduced power level. In the reduced pilot signal mode, when the detector detects a second WCD within the base station's service area, the controller increases the pilot signal's power level above the reduced power level in order to establish communications with the second WCD. Upon successfully connecting to the first and second WCDs, the base station may again reduce the pilot signal's power level to reduce interference with other base stations or wireless devices.

20 Claims, 11 Drawing Sheets

U.S. PATENT DOCUMENTS

| | | | |
|---|---|---|---|
| 2004/0116133 A1 | 6/2004 | Kalhan et al. | |
| 2004/0198220 A1 | 10/2004 | Whelan et al. | |
| 2004/0242257 A1* | 12/2004 | Valkealahti et al. | 455/522 |
| 2005/0059400 A1 | 3/2005 | Jagadeesan et al. | |
| 2005/0090277 A1 | 4/2005 | Islam et al. | |
| 2005/0135459 A1 | 6/2005 | Ginzburg et al. | |
| 2005/0197132 A1 | 9/2005 | Lee et al. | |
| 2005/0232189 A1 | 10/2005 | Loushine | |
| 2005/0237963 A1 | 10/2005 | Storm | |
| 2005/0250527 A1* | 11/2005 | Jugl et al. | 455/522 |
| 2005/0282494 A1 | 12/2005 | Kossi et al. | |
| 2006/0025138 A1 | 2/2006 | Kotzin | |
| 2006/0040656 A1 | 2/2006 | Kotzin | |
| 2006/0056448 A1 | 3/2006 | Zaki et al. | |
| 2006/0073840 A1 | 4/2006 | Akgun et al. | |
| 2006/0114885 A1 | 6/2006 | Baek et al. | |
| 2006/0121916 A1 | 6/2006 | Aborn et al. | |
| 2006/0203743 A1 | 9/2006 | Quinn et al. | |
| 2006/0264212 A1 | 11/2006 | Sekhar | |
| 2006/0268902 A1 | 11/2006 | Bonner | |
| 2007/0002813 A1 | 1/2007 | Tenny et al. | |
| 2007/0008925 A1 | 1/2007 | Dravida et al. | |
| 2007/0010261 A1 | 1/2007 | Dravida et al. | |
| 2007/0021127 A1 | 1/2007 | Zheng | |
| 2007/0049276 A1 | 3/2007 | Rimoni et al. | |
| 2007/0058598 A1 | 3/2007 | Ling | |
| 2007/0076662 A1 | 4/2007 | Jain et al. | |
| 2007/0104139 A1 | 5/2007 | Marinier et al. | |
| 2007/0121560 A1 | 5/2007 | Edge | |
| 2007/0140190 A1 | 6/2007 | Rensburg et al. | |
| 2007/0149211 A1 | 6/2007 | Dunn et al. | |
| 2007/0177530 A1 | 8/2007 | Ando et al. | |
| 2007/0184845 A1 | 8/2007 | Troncoso | |
| 2007/0254620 A1 | 11/2007 | Lindqvist et al. | |
| 2008/0076420 A1 | 3/2008 | Khetawat et al. | |
| 2008/0130555 A1 | 6/2008 | Kalhan | |
| 2008/0130596 A1 | 6/2008 | Kalhan | |
| 2008/0130597 A1 | 6/2008 | Kalhan | |
| 2008/0130598 A1 | 6/2008 | Kalhan | |
| 2008/0132239 A1 | 6/2008 | Khetawat et al. | |
| 2008/0153497 A1 | 6/2008 | Kalhan | |
| 2008/0261615 A1 | 10/2008 | Kalhan | |
| 2008/0311927 A1 | 12/2008 | Boman et al. | |
| 2008/0317159 A1* | 12/2008 | Moulsley et al. | 375/295 |
| 2009/0129341 A1 | 5/2009 | Balasubramanian et al. | |
| 2009/0156247 A1* | 6/2009 | Claussen et al. | 455/522 |
| 2009/0163216 A1 | 6/2009 | Hoang et al. | |
| 2009/0213819 A1 | 8/2009 | Kalhan | |
| 2009/0215400 A1 | 8/2009 | Chang et al. | |
| 2010/0093351 A1 | 4/2010 | Barrett et al. | |

FOREIGN PATENT DOCUMENTS

| | | |
|---|---|---|
| EP | 1 587 221 A2 | 10/2005 |
| EP | 1816888 | 8/2007 |
| EP | 1986341 | 10/2008 |
| JP | 07-154848 | 6/1995 |
| JP | 2005-110314 | 4/2005 |
| WO | WO 98-19474 | 5/1998 |
| WO | WO 02-054820 A2 | 7/2002 |
| WO | WO 2004-002051 | 12/2003 |
| WO | WO 2004-057815 | 7/2004 |
| WO | WO 2004-084463 A2 | 9/2004 |
| WO | WO 2005-076639 | 8/2005 |
| WO | WO 2007-064822 A2 | 6/2007 |
| WO | WO 2004/054153 | 6/2008 |
| WO | WO 2008-066926 | 6/2008 |
| WO | WO 2008-066927 | 6/2008 |
| WO | WO 2008-066928 | 6/2008 |
| WO | WO 2008-066929 | 6/2008 |
| WO | WO 2008-091412 | 7/2008 |
| WO | WO 2009-067700 | 5/2009 |

OTHER PUBLICATIONS http://mobilesociety.typepad.com/mobile_life/umts/page/2/.

Alejandro R. Holman and Edward G. Tiedemann Jr., "CDMA Inter-system", 1994 IEEE 44th Vehicular Technology Conference, Jun. 8, 1994. pp. 590-594, Stockholm, Sweden.

Carstens, Juergen, "A Method for Interference Control and Power Saving for Home Access Point", IP.Com Journal, Dec. 13, 2007, pp. 1-3, West Henrietta, NY US.

Han, et al., "A Method to Support Femto-Macro Handover with Minimal Interference to the Macro Network" IP.com Journal Oct. 16, 2008, pp. 1-4, West Henrietta, NY US.

* cited by examiner

PILOT SIGNAL TRANSMISSION MANAGEMENT

BACKGROUND

The invention relates in general to wireless communication systems, and more specifically to managing pilot signal transmission in a wireless communication system.

Base stations in cellular communication systems provide communications services to wireless communication devices within geographical cells where each base station exchanges signals with wireless communication devices within an associated cell. The size and shape of each cell is determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. Accordingly, a femtocell base station must also broadcast a pilot signal to enable communications with wireless communication devices. Since femtocells serve only a limited number of authorized users, the transmission of pilot signals from the femtocells are likely to interfere with unauthorized wireless communication devices that are not operating on the particular femtocell. Interference due to pilot signals increases with the number of femtocells within an area.

Accordingly, there is a need to reduce interference caused by pilot signal transmissions from base stations serving overlapping or neighboring geographical areas.

SUMMARY

Disclosed herein is a base station that is configured to reduce interference with other base stations and/or devices in a multi-cell wireless network. The base station includes a wireless interface, detector and controller. To reduce interference, the wireless interface may provide services to a first wireless communication device (WCD) using a pilot signal emitted from the base station at a reduced power level. In the reduced pilot mode, when the detector detects a second WCD within the base station's service area, the controller increases the pilot signal's power level above the reduced power level, in order to establish communications with the second WCD. Upon successfully connecting to the first and second WCDs, the base station may again reduce the pilot signal's power level to reduce interference with other base stations or devices.

Other aspects, features, advantages of the disclosed base station and related methods of transmitting a base station pilot signal will be or will become apparent to one with skill in the art upon examination of the following figures and detailed description. It is intended that all such additional aspects, features, methods and advantages be included within this description and be protected by the accompanying claims.

BRIEF DESCRIPTION OF THE DRAWINGS

It is to be understood that the drawings are solely for purpose of illustration and do not necessarily define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

Figure 1:
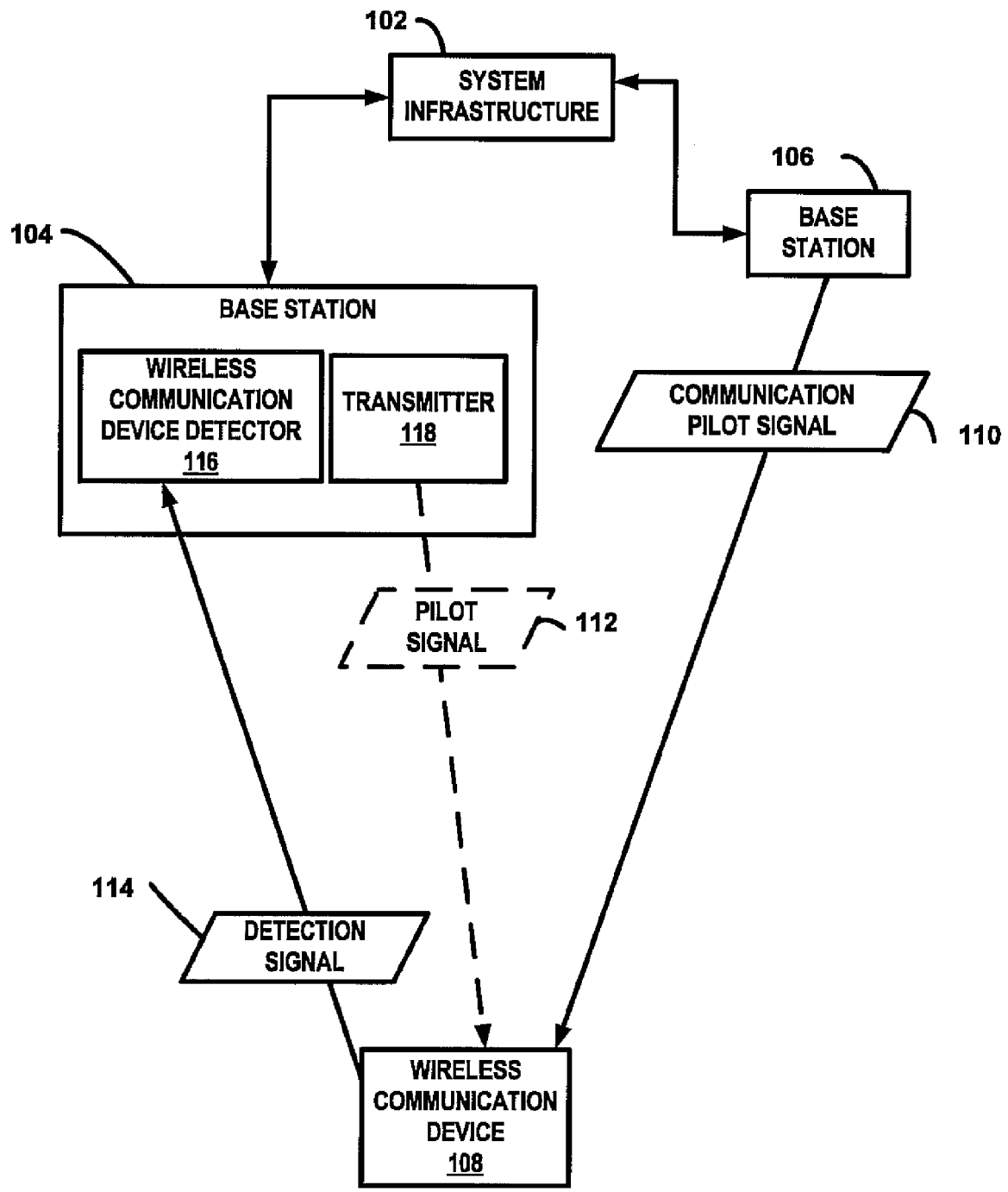
FIG. 1 is a block diagram of an exemplary communication system.

FIG. 1 is a block diagram of an exemplary communication system 100. The communication system 100 may be implemented in accordance with any of numerous technologies and communication standards. In the exemplary embodiment, the system operates in accordance with a Code Division Multiple Access (CDMA) standard such as cdma2000 1X. Examples of other suitable communication standards include other CDMA standards such as 1xEV-DO and W-CDMA, UMTS, and GSM standards, and OFDM based standards such as Wi-MAX. The various functions and operations of the blocks described with reference to the communication system 100 may be implemented in any number of devices, circuits, and/or elements as well as with various forms of executable code such as software and firmware. Two or more of the functional blocks of FIG. 1 may be integrated in a single device and the functions described as performed in any single device may be implemented over several devices. For example, at least portions of the functions of the system infrastructure 102 may be performed by the base station 104, a base station controller, or a Mobile Switching Center (MSC) in some circumstances.

The communication system 100 includes system infrastructure 102 that is connected to one or more base stations 104, 106. Communications between the base stations 104, 106 and one or more wireless communication devices are at least partially managed by the system infrastructure 102. In order for a wireless communication device (WCD) 108 to communicate with a particular base station, the WCD 108 must adequately receive a communication pilot signal transmitted from the particular base station. Other types of pilot signals however, may be transmitted to assist in handoffs and other functions. For example, beacon pilot signals are transmitted in some circumstances to facilitate handoffs from one service region to another and/or from one base station to another. Although beacon pilot signals may provide limited information, beacon pilot signals are typically not used as communication pilot signals and typically operate on a frequency channel different from the communication pilot signals. As discussed herein, therefore, pilot signals are signals transmitted at a particular frequency and include communication pilot signals and beacon pilot signals. Communication pilot signals are used for communication between the WCDs and base stations and provide information to the WCDs facilitating control and synchronization as well as other communication functions. A communication pilot signal, for example, may provide a timing reference and channel information. Beacon pilot signals are used for facilitating other functions such as detection and handoffs.

For the exemplary situation illustrated in FIG. 1, the WCD 108 is communicating with an originating base station 106 and receiving a communication pilot signal 110 transmitted by the base station 106. The originating base station 106 generates and transmits the communication pilot signal 110 which provides control and timing information to the WCD 108. When the detecting base station 104 detects the presence of the WCD 108, the base station 104 transmits a pilot signal 112. Depending on the particular implementation, the pilot signal 112 may be a communication pilot signal or a beacon pilot signal. Where the pilot signal 112 is a beacon pilot signal, the detecting base station 104 also transmits a communication pilot signal prior to a handoff of the WCD 108 from the originating base station 106 to the detecting base station 104.

Based on a detection signal 114 transmitted by the WCD 108, a WCD detector 116 within the base station 104 detects the presence of a WCD 108 that is authorized to access the base station 104. A transmitter 118 in the base station 102 does not transmit the pilot signal 104 until the WCD 108 is determined to be sufficiently close to the base station 104 for communication. Accordingly, the arrow and block representing the transmission of the pilot signal 112 are illustrated with dashed lines in FIG. 1 to indicate that the pilot signal 112 is not continuously transmitted. In some circumstances, the detection of the detection signal 114 by the WCD 116 detector is sufficient to determine that the WCD 108 is present and that the pilot signal 112 should be transmitted. Therefore, the characteristic of the detection signal 114 may be any of numerous parameters with any of numerous thresholds depending on the particular implementation and the characteristic may whether the detection signal 114 is detectable by the base station receiver. Examples of other characteristics include a signal to noise ratio (SNR), bit error rate (BER), power level, signal propagation time, and presence of particular data. In one configuration, the characteristic of the signal is the ability of the base station to demodulate and decode the detection signal 114 using a long code mask corresponding to authorized users of the base station.

The base stations 104, 106 provide wireless services within geographical services areas often referred to as cells. As discussed below with reference to FIG. 2A, FIG. 2B, and FIG. 2C, the originating base station 106 may be a macrocell base station that provides wireless service within a geographical service area that may overlap, completely surround, or be separate from the geographical service area of the base station 104. As discussed below, a suitable implementation of the base station 104 with a device detector 116 is within a cellular communication system where the base station 104 provides wireless communication services within a femtocell to authorized users. The base station 104, however, may in other circumstances be any other suitable type of base station within a communication system that requires a downlink (forward link) pilot signal.

The detection signal 114 may be any wireless signal suitable to indicate to the WCD detector 116 at least the presence of the WCD 108. Examples of detection signals 106 include optical signals and radio frequency (RF) signals such as cellular, Bluetooth, Near-Field Communication and WiFi signals. In certain configurations, the detection signal is a reverse link (uplink) communication signal transmitted in accordance with wireless communications between the WCD and the originating base stations 106. Where the detection signal 114 is signal other than an uplink cellular signal, a common source clock and/or a predetermined transmission schedule may be used. In such an example, therefore, the transmission of the detection signal 114 is synchronized to a clock used by the originating base station and the femtocell base station synchronizes monitoring for the detection signal to a time source synchronized to the same reference as the originating base station clock. Accordingly, the transmission and monitoring of the detection signal is synchronized. As a result, resources for monitoring the channel for the detection signal are minimized. Further, the ability of the femtocell base station to detect the detection signal may improve since the receiver may more easily determine when and how to discriminate this signal from other similar signal sources. In an exemplary implementation, the detection signal 114 provides information adequate for the WCD detector 116 to determine that the WCD 108 is an authorized user of the base station 104.

Figure 2A:
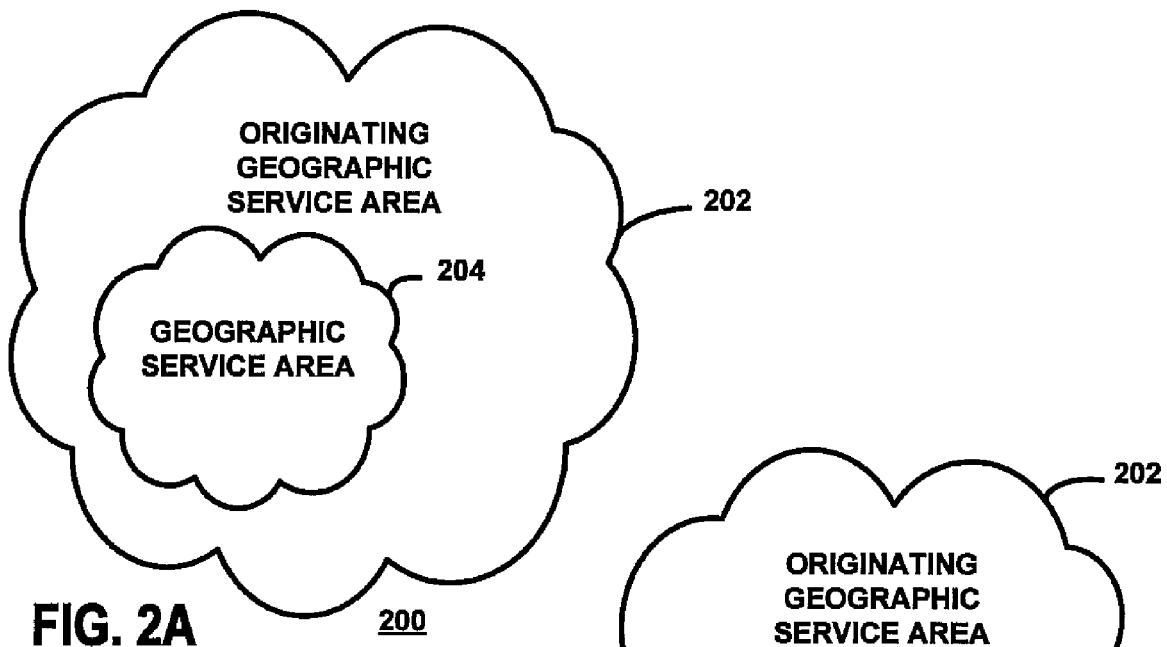
FIG. 2A is an illustration of an exemplary geographical service area relationship provided by an originating base station and detecting base station where the geographic service area of a detecting base station is within an originating geographic service area of the originating base station.
Figure 2B:
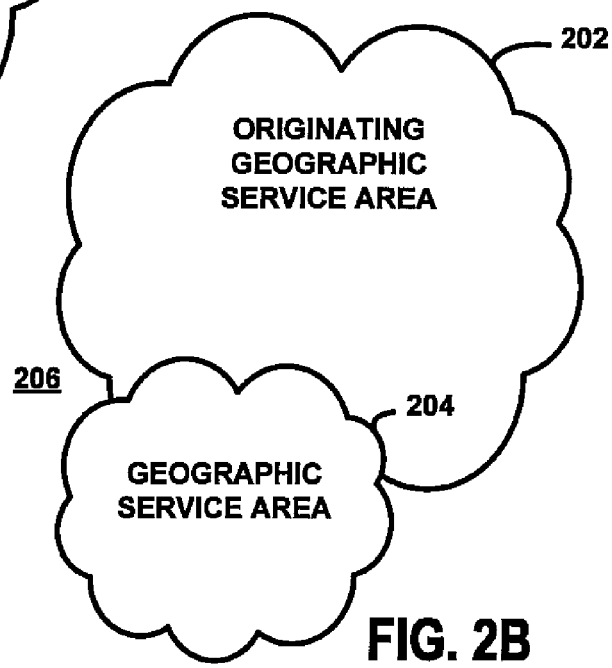
FIG. 2B is an illustration of an exemplary geographical service area relationship provided by the originating base station and the detecting base station where the geographic service area of a detecting base station overlaps with the originating geographic service area of the originating base station.
Figure 2C:
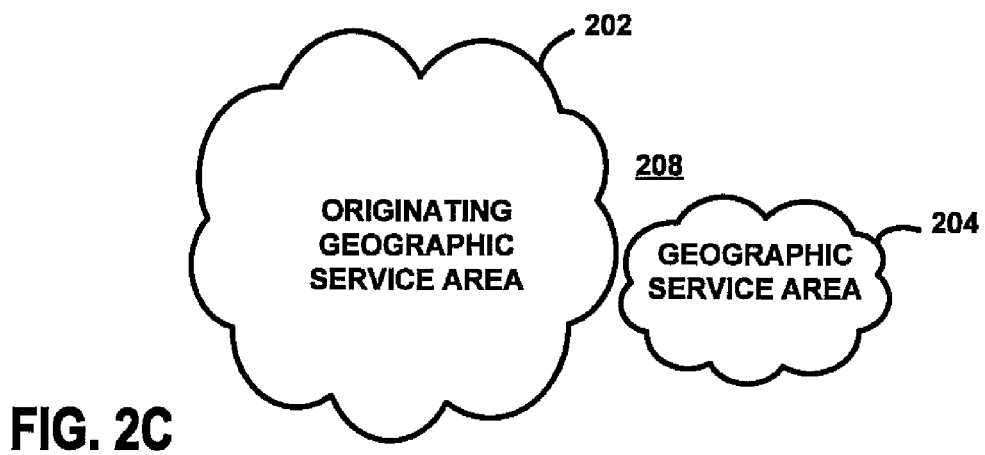
FIG. 2C is an illustration of an exemplary geographical service area relationship provided by the originating base station and the detecting base station where the geographic service area of a detecting base station does not overlap with the originating geographic service area of the originating base station.

FIG. 2A, FIG. 2B and FIG. 2C are depictions of exemplary geographical service area relationships 200, 206, 208 provided by the originating base station 106 and the base station 104. An originating geographical service area 202 provided by the originating base station 106 and a geographic service area 204 provided by the detecting base station 104 may have any of numerous shapes, sizes, and configurations. Accordingly, the clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 2A, the service area 204 of the detecting base station 104 is completely within the service area 202 provided by the originating base station 106. Such service area relationships 200 often occur where some base stations within the communication system provide smaller service regions such as microcell, picocell, and femtocell configurations. A femtocell arrangement, for example, may include a femtocell base station located at a residence where the femtocell is a service area for devices used by device users living at the residence. When the WCDs are outside the service area 204, service is provided by larger macrocells. When the authorized WCD is at the residence, however, service is provided by the base station presenting the smaller femtocell service area 204. Accordingly, in most situations, the service area 204 of the detecting base station 104 will be completely within the service area 202 of the originating base station 106. In some situations, however the service area 204 may be partially overlapping with the service area 202 as shown in FIG. 2B or may be non-overlapping but adjacent to the service area 202 as shown in FIG. 2C.

Figure 3:
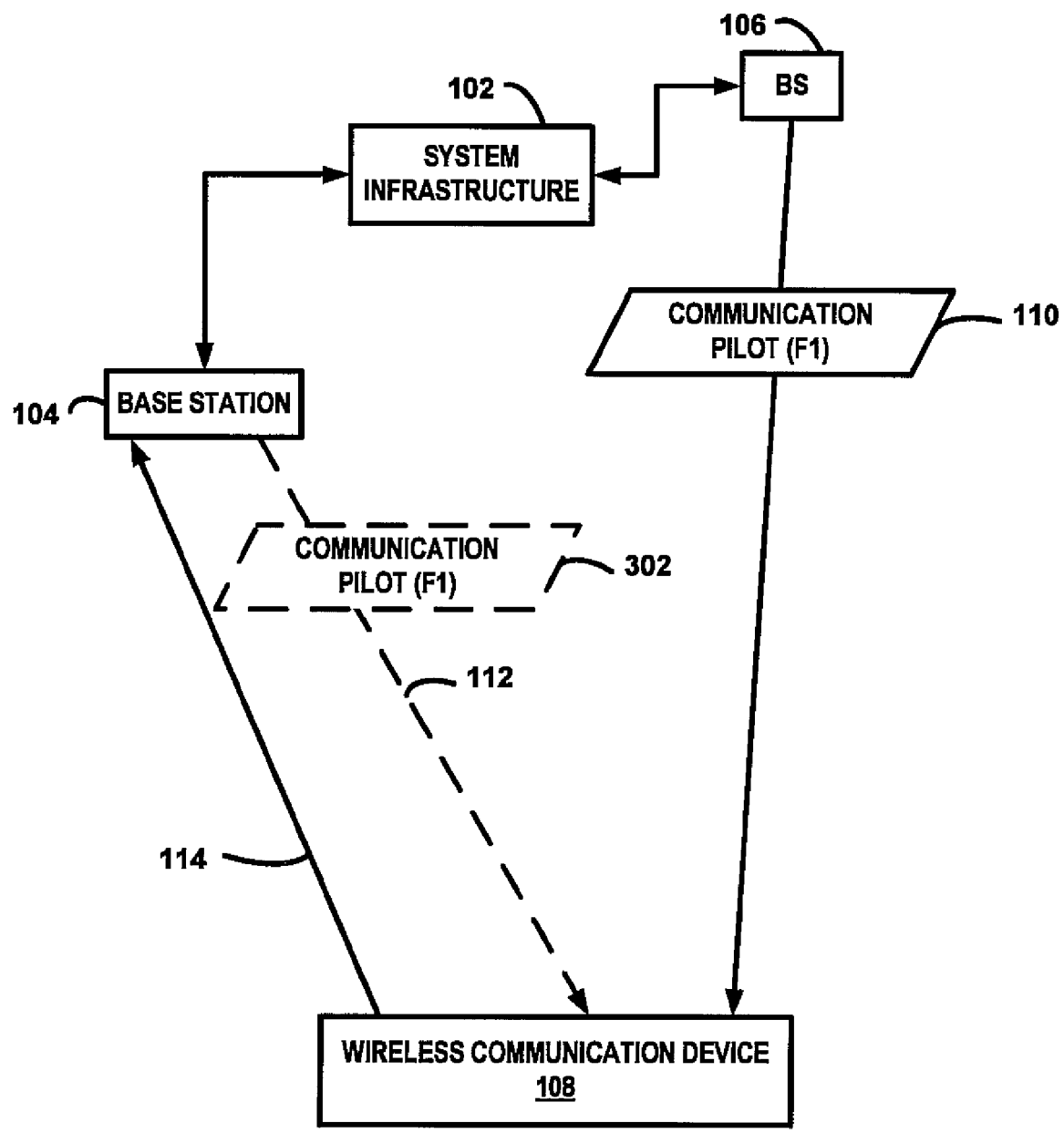
FIG. 3 is a block diagram of the wireless communication system where the pilot signal is a communication pilot signal having the same frequency (F1) as the frequency (F1) of the communication pilot signal transmitted by the originating base station.

FIG. 3 is a block diagram of the wireless communication system 100 where the pilot signal 112 is a communication pilot signal 302 having the same frequency (F1) as the frequency (F1) of the communication pilot signal 110 transmitted by the originating base station 106. When the detecting base station 104 determines that the WCD is sufficiently close, the base station 104 begins transmitting the communication pilot signal 302 (pilot signal 112). Accordingly, by refraining from transmitting the communication pilot signal 302 until the presence of a WCD 108 is detected by the base station 104, interference to non-authorized devices from the communication pilot signal 110 is minimized. In a CDMA case, the pilot signal 112 may use a scrambling code (or PN Offset) different from that used on the communication pilot signal 110. In addition, a femtocell may coordinate with the network and other femtocells in the region and set a schedule for transmitting each corresponding pilot signal minimizing collisions and reducing interference.

Figure 4:
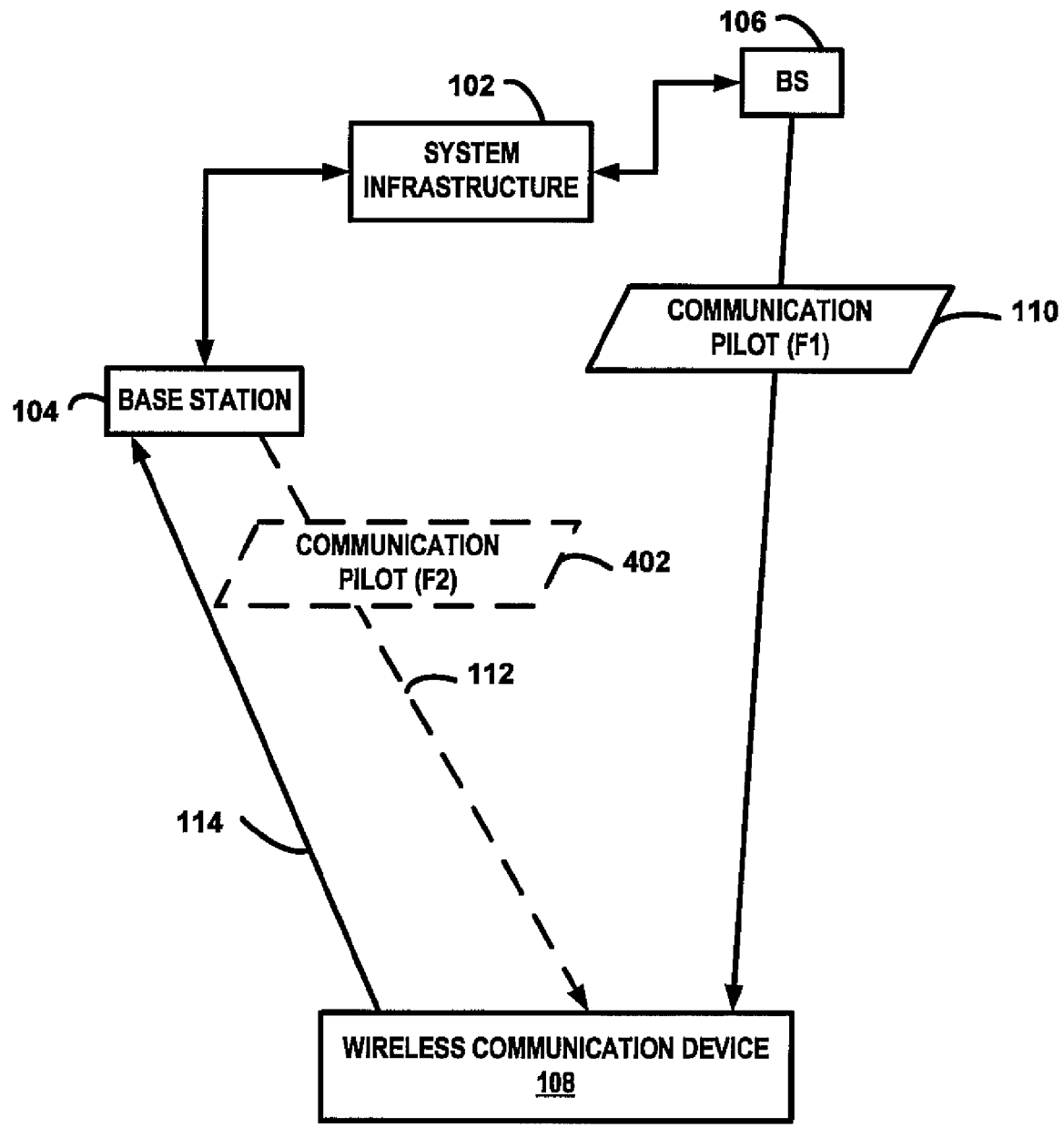
FIG. 4 is a block diagram of the wireless communication system where the pilot signal is a communication pilot signal having a different frequency (F2) from the frequency (F1) of the communication pilot signal transmitted by the originating base station.

FIG. 4 is a block diagram of the wireless communication system 100 where the pilot signal 112 is a communication pilot signal 402 having a different frequency (F2) from the frequency (F1) of the communication pilot signal 110 transmitted by the originating base station 106. When the detecting base station 104 determines that the WCD is sufficiently close, the base station 104 begins transmitting the communication pilot signal 402 (pilot signal 112). Although the pilot signal 112 has a different frequency than the pilot signal 110, interference in the system 100 is reduced since one or more other base stations in the system 100 may use the same frequency for communication for transmitting a pilot signal. For example, where several femtocell base stations 104 provide services within femtocell service areas that are within a macrocell service area, one or more of the femtocell base stations 104 may use the same frequency (F2) for transmitting the pilot signal 112 although the frequency (F2) is different from the frequency (F1) of the communication pilot signal 110 transmitted by the macrocell base station 106. Accordingly, pilot interference between femtocells is reduced by limiting pilot transmissions to situations where the presence of an authorized WCD is detected. Additionally, limiting pilot transmissions until the detection of an authorized WCD will reduce the likelihood of unauthorized WCDs from acquiring the femtocell base station (104). In a situation where a WCD is "camped on" a femtocell base station and continues to receive the pilot even though the WCD is not authorized to use the femtocell base station, the device will not be able to make any calls and more importantly, will not be able to receive any calls. Limiting pilot transmissions only when authorized devices are detected reduces the likelihood of these situations. In the CDMA case, the pilot signal 112 may use a scrambling code (or PN Offset) different from the code used on the pilot signal 110. In addition, a femtocell may coordinate with the network and other femtocells in the region and set a schedule for transmitting its pilot signal.

Figure 5:
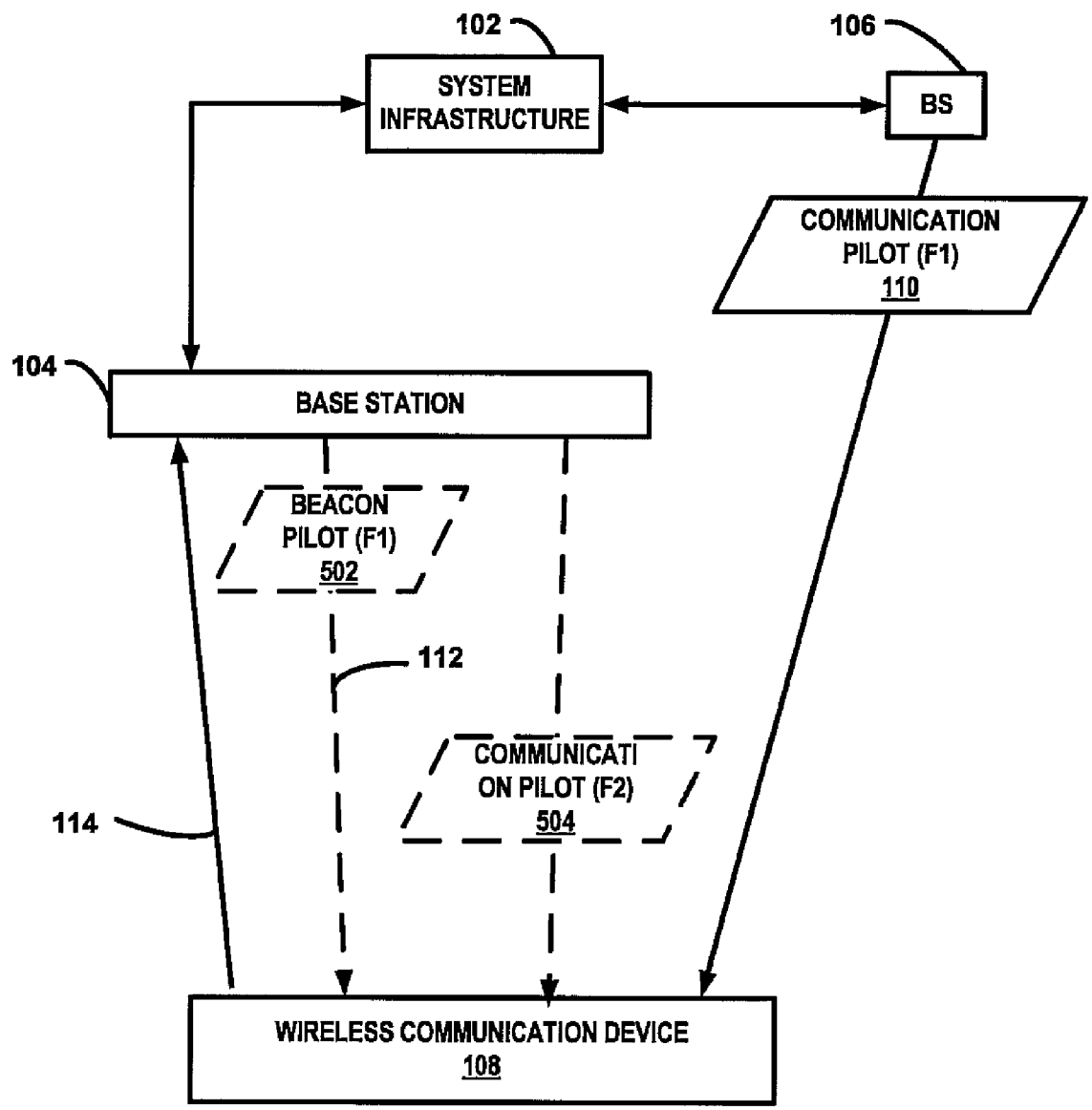
FIG. 5 is a block diagram of the wireless communication system where the pilot signal is a beacon pilot signal.

FIG. 5 is a block diagram of the wireless communication system 100 where the pilot signal 112 is a beacon pilot signal 502. For the situation illustrated in FIG. 5, the detecting base station 104 transmits a beacon pilot signal 502 (pilot signal 112) having the same frequency (F1) as the frequency (F1) of the communication pilot 110 transmitted from the originating base station 106. In OFDM based beacon transmissions, frequency F1 is one of the tones of a wideband channel. The macro BS is aware of the beacons' timing and tone location of the beacon to avoid, or at least minimize, collisions. The beacon pilot signal 502 is not transmitted until the base station 104 detects the presence of an authorized WCD 108. When the communication device 108 detects the pilot beacon signal 502 a handoff is initiated through the communication system. The detecting base station 104 transmits a communication pilot signal 504 after detecting presence of the authorized WCD 208. The detecting base station 104 may simultaneously begin transmitting the beacon signal 502 and the communication pilot signal 504. In active, or connected state, however, the base station 104 refrains from transmitting the communication pilot signal 504 until receiving information from the network indicating the WCD 108 will be handed off from the originating base station 106 to the detecting base station 104. If the device is in the idle state, the network does not send any information to base station 104 in the exemplary embodiment. For the case of an idle handoff, both the beacon pilot signal 502 and the communication pilot signal 504 will be transmitted when the authorized WCD 108 is detected. Therefore, a typical handoff scenario during the connected state includes the detection of the authorized WCD 108 followed by transmission of a beacon pilot signal 502. The WCD reports the signal quality of the beacon pilot signal 502 received at the device 108 to the system infrastructure 102 and begins a handoff procedure if instructed by the system infrastructure 102. The system infrastructure 102 also informs the detection base station 104 of the handoff triggering the transmission of the communication pilot signal on the appropriate frequency (F2).

Figure 6:
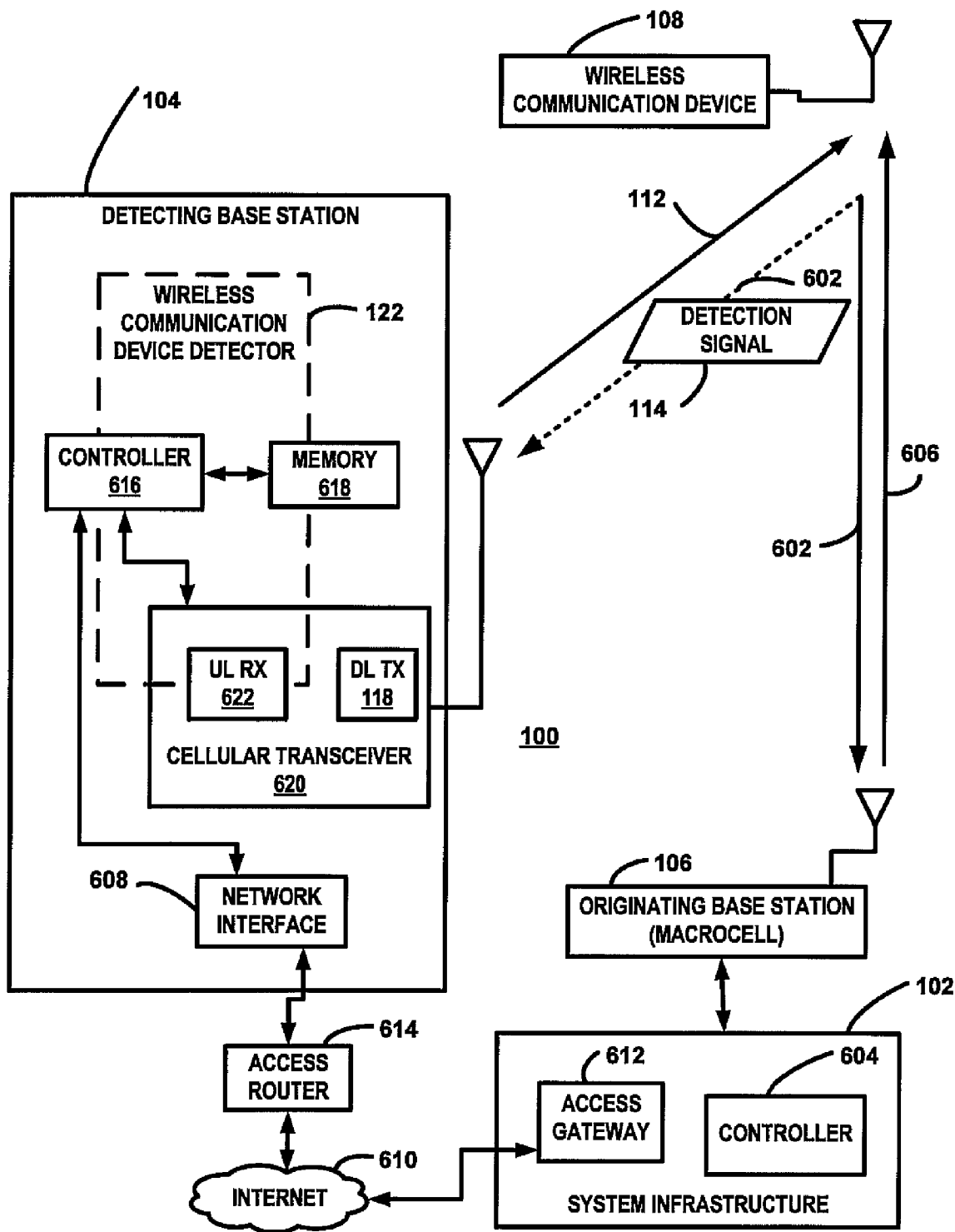
FIG. 6 is a block diagram of an exemplary communication system where the detection signal is an intercepted uplink (reverse link) cellular signal.

FIG. 6 is a block diagram of an exemplary communication system 100 where the detection signal 114 is an intercepted uplink (reverse link) cellular signal 602. The system 100 may be implemented using any variety of communication technologies and cell sizes. For the example discussed with reference to FIG. 6, the detecting base station 104 provides wireless service within a femtocell and the originating base station 106 provides service within a macrocell. The base stations 104, 106 operate in accordance with CDMA protocols and standards. The term macrocell is used primarily to distinguish this group of diverse technologies from picocells and femtocells that typically have smaller service areas on the order of 100 to 300 feet per base station. Accordingly, the originating base station 106 is any base station that provides wireless communication services within relatively large geographical areas as compared to the femtocell service area provided by the detecting base station in the example of FIG. 6. The functional blocks of FIG. 6 may be implemented using any combination of hardware, software and/or firmware. Two or more of the functional blocks may be integrated in a single device and the functions described as performed in any single device may be implemented over several devices. For example, at least portions of the functions of the system infrastructure 102 may be performed by the base station 106, a base station controller, or an MSC in some circumstances.

The originating base station 106 transmits downlink signals 606 to and receives uplink signals 602 from one or more wireless communication to provide wireless communication service. As discussed herein, wireless communication services refer to any communications, control signaling, pilot signals or other communication that at least partially facilitates operation of the one or more WCDs 108. Accordingly, wireless communication services may be provided to the WCDs when the devices 108 are in an idle state or an active state.

The system infrastructure includes a controller 604 that may be implemented as a mobile switching center (MSC), a combination of an MSC and base station controllers (BSCs), or other similar communication controllers. The controller 604 is connected to the base stations 104, 106 through the system infrastructure 102 and manages communications within the system 100. A network interface 608 within the detecting base station 104 facilitates communication with the Internet 610. The network interface 608 provides packet data communications and facilitates access to the Internet and to an access gateway 612 in the system infrastructure 102 through the access router 614. The access router 614 may be connected to several base stations 104 and provides communication management and control functions to the base station 104. In some situations, the access router 614 may be implemented within the base station 104 or may be eliminated. In some circumstances, the connection between the access gateway 612 and the base station 104 may include a wireless communication link such as satellite communication link or point-to-point microwave link, for example. Also, in some situations, circuit switched connections may be used to connect the detecting base station 104 to the system infrastructure 102. In a typical arrangement, the detecting base station 104 is connected to the Internet through an Internet Service Provider (ISP) service provided by a digital subscriber line (DSL) or CATV connection. Accordingly, the access router 614 may include a DSL modem or cable modem in some arrangements. In other arrangements, the network interface 608 may include a DSL modem or cable modem that directly interfaces with the Internet 610, and the access router 614 is not necessary. In either arrangement, the system infrastructure 102 comprises a packet switched core network that includes at least one access gateway 612. The access gateway 612 is a communication interface that allows the base station 104 to communicate with the system infrastructure 102.

The WCD 108 is any type of communication device that is capable of communicating with the base stations 104, 106. The WCD 108, sometimes referred to as an access terminal, may be a wireless modem, a personal digital assistant, cellular telephone, or other such device.

In addition to the functions and features discussed herein, the detecting base station 104 operates in accordance with the communication protocols of the communication system 100. The base station 104 includes a controller 616, memory 618, and a wireless interface that includes at least a cellular transceiver 620, and the network interface 608 in addition to other devices and software for performing the functions of the base station 104. The cellular transceiver 620 includes an uplink receiver (UL RX) 622 and the downlink transmitter (DL TX) 118. For the example in FIG. 6, the WCD detector 122 is implemented by at least portion of the controller 616, memory 618, and uplink receiver 622. Accordingly, the WCD detector 122 is illustrated with a dashed line box to indicate that the detector 122 may include some or all various functions and devices forming the cellular transceiver 620, memory 618 and/or controller 616.

In addition to other information, the memory 618 stores communication device identification values corresponding to each communication device 108 that is authorized to receive service from the base station 104. The communication device identification value may include an electronic serial number (ESN), Mobile station Equipment Identifier (MEID) or International Mobile Subscriber Identity (IMSI) or other unique data identifying the WCD 108. An example of a group of identification values stored in memory includes a collection of ESNs corresponding to the communication devices of the family members of a household where the base station 104 provides service. The identification values may be stored at the base station 104 using any of numerous techniques. An example of a suitable method of storing the values includes storing the values during an initialization procedure performed when the base station 104 is installed. The identification values may be provided, at least partially, by the core network or macro base station. In some implementations, the identification values may be omitted or the base station 104 may allow communication devices that do not have corresponding identification values stored at the base station 104 to receive service from the base station 104. As discussed below, the ESNs are used to generate long code masks such as public long code masks (PLCMs) which allow the detecting base station to receive signals from the WCD 108 having the particular ESN. Other information may be received from the core network to generate the PLCMs in accordance with known techniques. In some situations, the core network, or base station may assign the PLCM to a particular WCD 108. The assigned PLCM value is stored in the base station 104. Also, a private long code mask may be used instead of or in addition to the PLCM in some cases.

During operation, the detecting base station 104 refrains from transmitting a communication pilot signal 112 when no WCD 108 is within service range. The detecting base station 104, however, at least periodically monitors a wireless channel that may include the detection signal 114. The detection signal 114 may be any signal transmitted by the communication device 108, including but not limited to, registration messages, acknowledgement messages, reverse traffic channel data packets and signaling messages. For the example of FIG. 6, the detection base station 104 monitors the reverse link cellular channel used for transmitting signals from WCDs 108 to the originating base station (macrocell base station) 106. The cellular uplink receiver 622 is tuned to the appropriate channel or channels to detect the uplink signal 602 transmitted by the WCD 108. In the exemplary embodiment, the uplink receiver 622 sufficiently demodulates and decodes uplink signals to identify the long code mask. The long code mask is typically a 42 bit binary number that is unique to the WCD 108. In the exemplary embodiment, received signals are compared to a list of long code masks to determine if the signal was transmitted by an authorized WCD 108. As described above, the authorized WCDs are identified by device identifiers stored in memory. The identifiers either directly, or indirectly, correspond to long code masks that facilitate reception of the signals transmitted by the authorized devices in the exemplary embodiment. Typically, the PLCM is derived from a permutation of the bits of the ESN. PLCM may also be based on the Mobile station Equipment Identifier (MEID) or the International Mobile Subscriber Identity (IMSI). The base station 104 evaluates one or more characteristics of the uplink signal to determine if the WCD transmitting the signal is within the service area of the base station or at least whether the device is possibly within the service area of the detecting base station 104. In the exemplary embodiment, the controller 616 determines if the uplink signal 602 can be successfully received. If the signal can be received, the controller 616 determines that the WCD 108 is sufficiently close to receive service from the base station 104. In some cases, the uplink signal may be detected and received even though the WCD 108 is not within the service area of the base station 104. In these circumstances, the WCD 108 may unsuccessfully attempt to acquire service from the base station 104 or the beacon signal may be transmitted from the base station 104 unnecessarily.

In some situations, the determination of whether to transmit the pilot signal may be based on other characteristics of the identification signal in addition to the detection of the signal. For example, the proximity of the WCD 108 to the detecting base station 104 may be calculated or estimated based on characteristics of the detection signal 114 and the pilot signal may be transmitted only when the estimated proximity is less than a proximity threshold. Examples of detection signal characteristics include a signal to noise ratio (SNR), bit error rate (BER), frame error rate (FER), packet error rate (PER), power level, and signal travel time.

The controller 616 may determine, or at least estimate, the proximity of the authorized WCD 108 to the detecting base station 104 based on one or more characteristics of the uplink signal. In the exemplary embodiment, the detection of an uplink signal from the communication device 108 is sufficient to determine that the communication device 108 is within a proximity range. The proximity is used to determine whether the communication device 108 is possibly within range of the base station 104 and at least possibly able to receive communication service from the base station 104. Therefore, the controller 616 at least determines whether the communication device is possibly within range of the base station 104. If the controller determines that the WCD is possibly in range, the communication pilot signal 112 is transmitted by the downlink transmitter.

The controller 616 may determine whether to transmit the pilot signal 112 based on factors other than proximity of the WCD 108 or the detection of the detection signal 114. For example, factors may include the available capacity of the detecting base station 104, core network requirements, required bandwidth of the WCD communications, and availability of other base stations or communication service providers in the area. Accordingly, the base station 104 may not transmit the pilot signal even if the WCD is within range in some circumstances. As explained above, a detecting base station may coordinate with the network and other femtocells in the region and set a schedule for transmitting its pilot signal to avoid collisions and reduce interference. In OFDM systems, fractional frequency reuse (FFR) may be coordinated among femtocell base stations to manage resources.

Although the WCD detection methods described above in connection with FIGS. 3-6 may be applied to second and subsequent WCDs entering the service area of the base station 104, the controller 616 determination of whether to turn on and transmit the pilot signal 112 applies only to a first WCD 108 to enter the base station 104 service area. Second and subsequent WCDs entering the base station 104 service area may find that the communication pilot signal of the base station 104 is already on, albeit at a reduced power level, when they enter the service area of the base station 104 while it is serving the first WCD. For second or subsequent WCDs, the controller 616 determines whether to increase the pilot signal power level from the reduced power level in order to allow the additional WCDs to connect to the base station 104, as further described below in connection with FIGS. 10-11.

Figure 7:
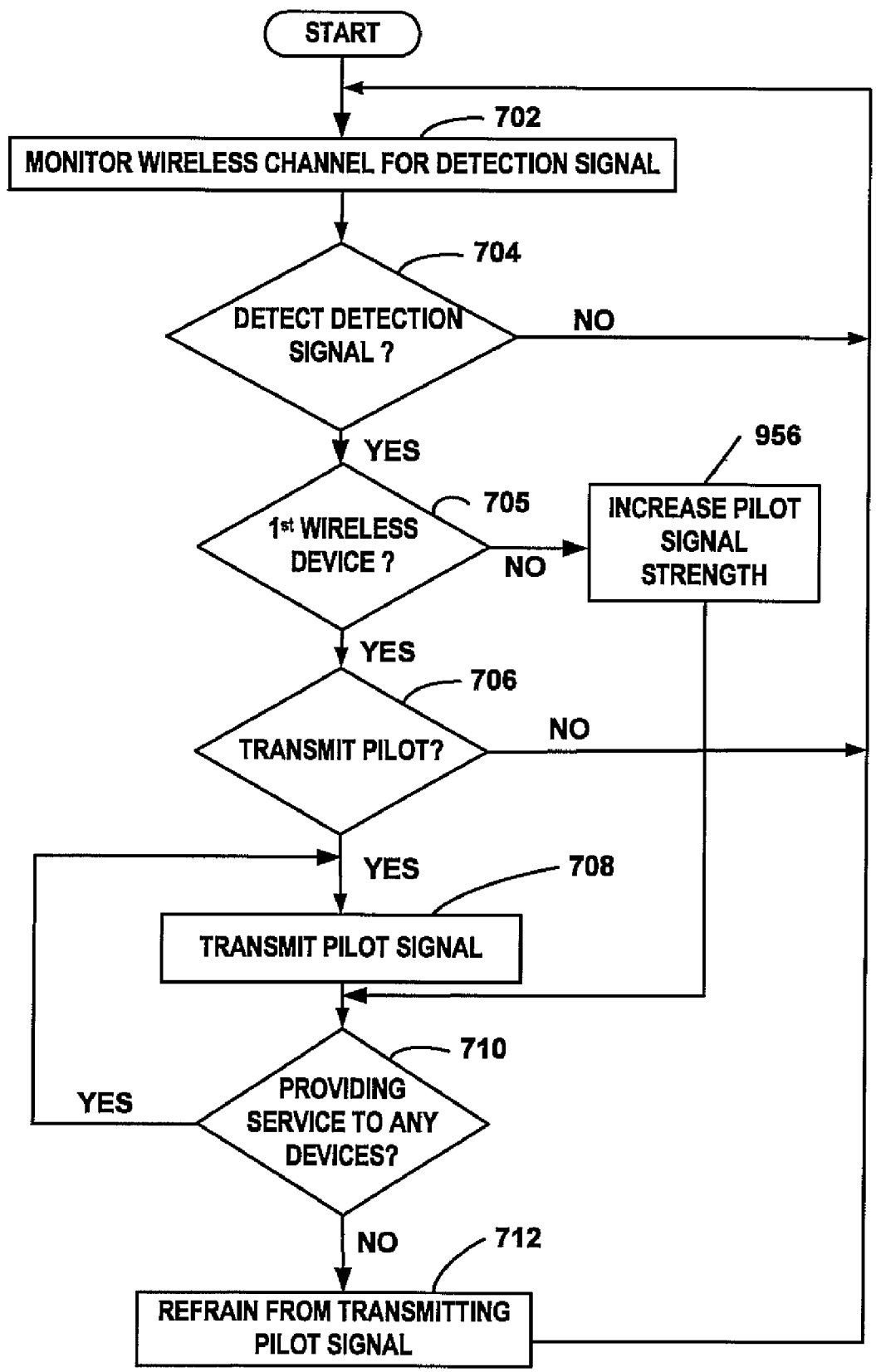
FIG. 7 is flow chart of a method of managing wireless service to a WCD, where the presence of the WCD is determined based on the detection of the detection signal.

FIG. 7 is flow chart of a method of managing wireless service to a WCD 108 where presence of the WCD is determined based on the detection of the detection signal. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 616 in the detecting base station 104.

At step 702, the wireless channel that may contain the detection signal is monitored. The WCD detector 122 attempts to demodulate and/or decode incoming signals within the wireless communication channel. In the exemplary embodiment, the uplink receiver (622) is tuned to decode any uplink signals 602 transmitted from any of the communication devices 108 in the user list stored in memory 618. The long code masks derived with the device identification values are applied to incoming signals until an incoming signal is detected. In this implementation, therefore, the incoming uplink signal 602 is the detection signal 114. Where other types of detection signals such as Bluetooth signals are used, the WCD detector may compare a characteristic of the received signals to determine whether a received signal was transmitted by a device within the user list. Accordingly, a Bluetooth signal may include an identification code that corresponds to the device identification values stored in memory 618. In some circumstances, the WCD detector 122 may be configured to monitor all channels for any detection signals.

At step 704, it is determined whether a detection signal 114 has been received. In the exemplary embodiment, the controller 616 determines that a detection signal 114 has been received if an incoming signal can be decoded. In other circumstances, information within the detection signal is applied to the user list to determine whether the received signal has been received from a communication device stored in the user list. If a detection signal 114 has been received, the method continues at step 706. Otherwise, the method returns to step 702 to continue monitoring the wireless channel.

At step 705, a determination is made whether the detection signal is from a first WCD attempting to connect to the base station 104. If no other WCDs are connected to the base station 104, the detected WCD is the first WCD and the method proceeds to step 708; otherwise the method proceeds to step 956. In step 956, if there are one or more WCDs already connected to the base station 104, for second or subsequent WCDs attempting to connect to the base station 104, the pilot signal power level is increased from a reduced power level to a nominal power level, as discussed further in connection with FIGS. 10-11.

At step 706, it is determined if the pilot signal should be transmitted. In the situation where there are currently no WCDs connected to the base station 104, the determination is whether to turn on and transmit the pilot signal. In some situations, this step can be omitted and the pilot signal may be transmitted when the detection signal is detected. In other situations, however, additional processing or communication is invoked and occurs before the pilot signal is transmitted. For example, system conditions of the detection base station 104, other base stations, the core network, and/or alternate networks can be evaluated to determine whether a handoff to the detecting base station 104 is desired. Further, the detecting base station 104 may transmit a message to the core network indicating that the identified WCD may be within the service area of the detecting base station 104. The core network may evaluate required bandwidth or other parameters and may provide instructions to the detecting base station on whether the pilot signal should be transmitted. If it is determined that the pilot signal should be transmitted, the method continues at step 708. Otherwise, the method returns to step 702.

At step 708, the pilot signal is transmitted. For a first detected WCD attempting to connect to the base station 104, the pilot signal is turned on. The pilot signal power level may then be subsequently reduced for the first WCD, as discussed below in connection with FIGS. 10-11. The pilot signal may be a communication pilot signal or may be a beacon pilot signal in some circumstances. In some situations, both a communication pilot signal and a beacon pilot signal are transmitted.

At step 710, it is determined whether the base station 104 is providing service to any WCDs. If at least one wireless device 108 is communicating with the base station 104, the method returns to step 708 to continue transmitting the pilot signal. If no WCDs 108 are communicating with the base station 104, the base station 104 stops transmitting the pilot signal at step 712 and returns to step 702. Providing wireless service includes providing communication service to devices 108 in active states as well as providing other services to devices in idle states such as, for example, pages from incoming calls, SMS, registration and administrative related services. Accordingly, the detecting base station determines whether any WCDs 108 are in active state and communicating with the detecting base station and also determines if any devices are in the idle state. If the detecting base station determines that there are no active devices 108 within the cell, the base station 104 determines whether any idle devices 108 may still be within the cell. The detecting base station may use any of several methods to determine if devices 108 in the idle state are still within range of the detecting base station 104. One suitable example includes a requiring a time-based registration from idle devices where the WCD 108 periodically registers with the detecting base station. If the detecting base station determines that no idle devices are registering, the base station determines that no devices are receiving wireless service. Another suitable example includes receiving a message from the core network indicating that WCD 108 has registered with another base station such as the originating base station 106. If all previously registered devices are determined to have migrated to other base stations based on the core network messages, the detecting base station 104 determines that no communication devices are receiving wireless service. Another suitable example includes including a request and acknowledgement messaging arrangement where the detecting base station 104 periodically sends an Order Message to devices that may be in an idle state. If no acknowledgement message is received, the detecting base station determines that the device 108 is not longer in the cell. If no previously detected devices 108 are determined to be still within the cell, the detecting base station 104 determines that no WCDs 108 are receiving wireless service and the method continues at step 712 where pilot signal is turned off.

Figure 8:
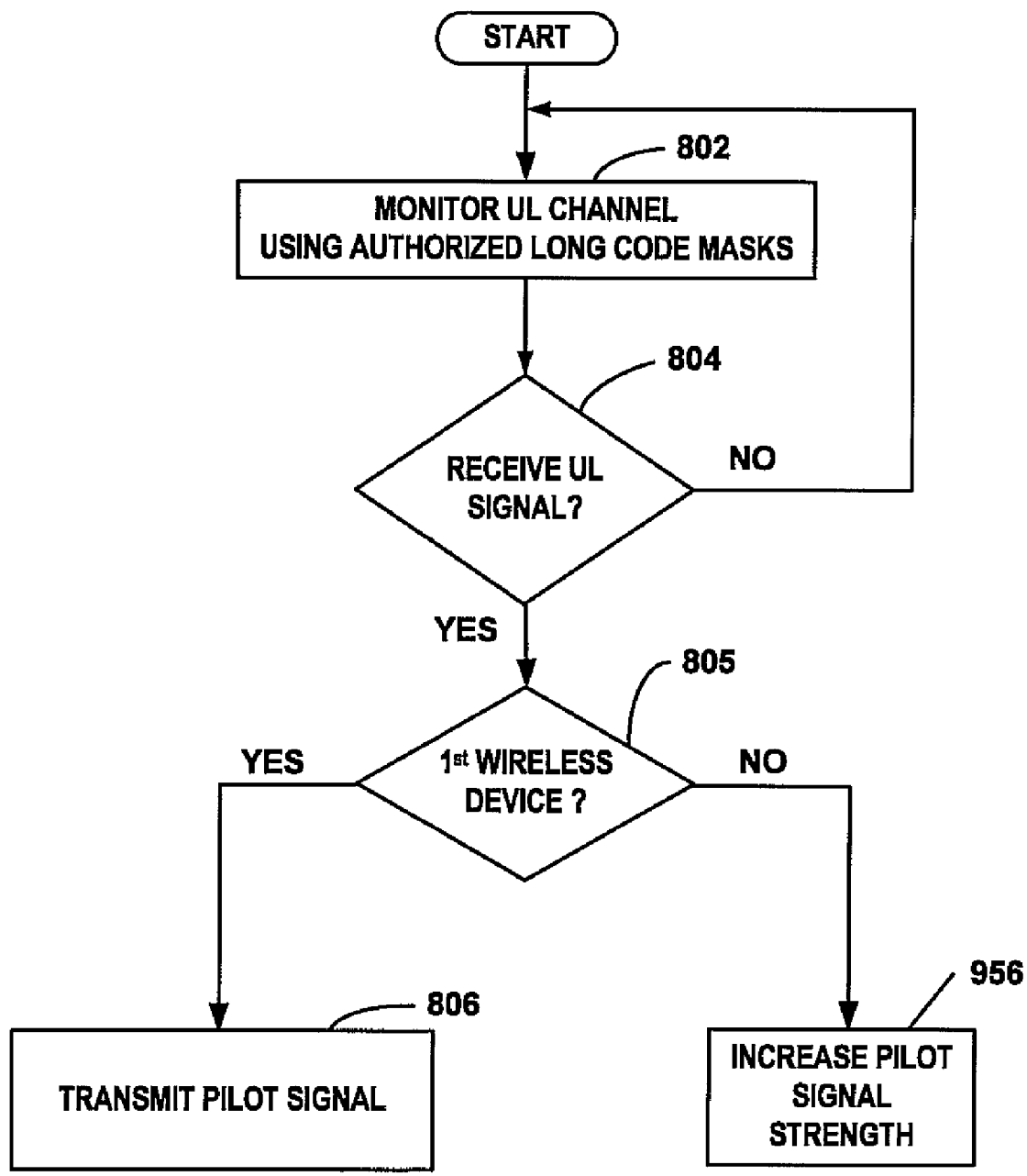
FIG. 8 is a flow chart of a method of managing transmission of pilot signals, where the detection signal is an uplink signal transmitted by an authorized WCD.

FIG. 8 is a flow chart of a method of managing transmission of pilot signals where the detection signal is an uplink signal transmitted by an authorized WCD 108. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 616 in the detecting base station 104.

At step 802, the uplink channels are monitored for an uplink signal that is transmitted with a PLCM corresponding to an authorized communication device in the user list. The WCD detector attempts to decode incoming signal using the PLCM derived from the device identification values. The device identifiers, such as EINs, MEIDs, or IMSIs, are applied in accordance with known techniques and the convention of the macro base station to generate a PLCM for each authorized device. Demodulated signals are decoded using the PLCMs to attempt to decode the incoming signals. In some cases the PLCM maybe assigned by the base station.

At step 804, it is determined if an uplink signal is received from an authorized WCD 108. If an incoming signal is successfully decoded, the controller 616 determines that the detection signal has been received. Otherwise, the method returns to step 802 to continue monitoring the uplink channels.

At step 805, a determination is made whether the detection signal is from a first WCD attempting to connect to the base station 104. If no other WCDs are connected to the base station 104, the detected WCD is the first WCD and the method proceeds to step 806; otherwise the method proceeds to step 956. In step 956, if there are one or more WCDs already connected to the base station 104, for second or subsequent WCDs attempting to connect to the base station 104, the pilot signal power level is increased from a reduced power level to a nominal power level, as discussed further in connection with FIGS. 10-11.

At step 806, the base station 104 turns on and transmits the pilot signal for the first WCD. For a first detected WCD to connect to the base station 104, the transmission of the pilot signal simply involves turning on the pilot signal. The pilot signal power level may then be subsequently reduced for the first WCD, as discussed below in connection with FIGS. 10-11.

Figure 9:
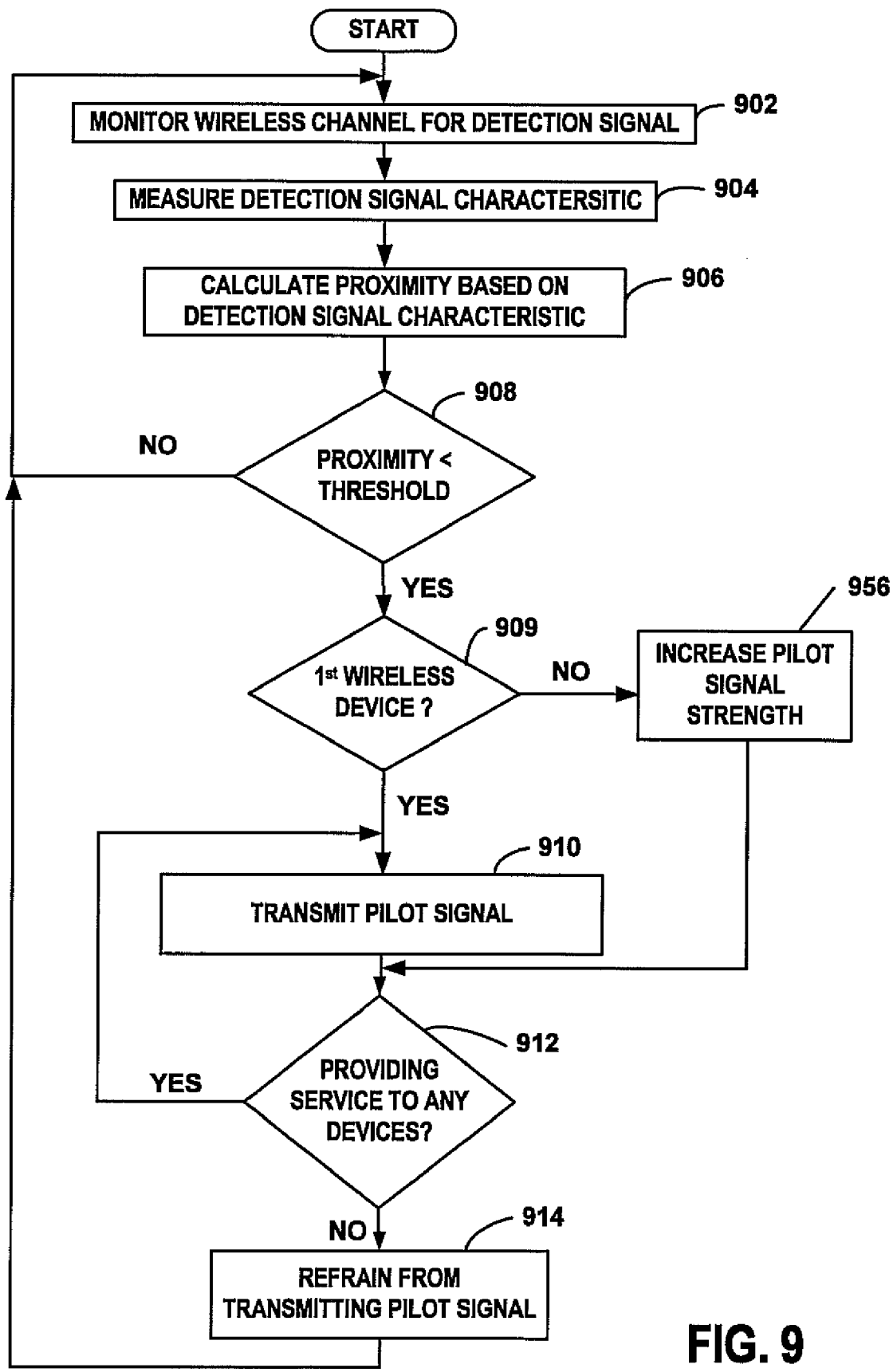
FIG. 9 is a flow chart of a method of managing transmission of pilot signals where the proximity of the WCD to the detecting base station is determined based on the detection signal.

FIG. 9 is a flow chart of a method of managing transmission of pilot signals where the proximity of the WCD 108 to the detecting base station 104 is determined based on the detection signal. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 616 in the detecting base station 104.

At step 902, the wireless channel that may contain the detection signal is monitored. The WCD detector 122 attempts to demodulate and/or decode incoming signals within the wireless communication channel.

At step 904, a characteristic of the detection signal is measured. One or more parameters such as power level or signal travel time are measured.

At step 906, the proximity of the communication device 108 to the detecting base station 104 is calculated. The proximity calculation may be based on any number of parameters or characteristics of the received detection signal as well as other factors. Examples of suitable parameters include parameters related to signal power level and a timing offset between a transmission and reception times. Other related factors may include transmission power level, location of one or more base stations and information extracted from detection signal and downlink signals such as time stamps, power level indicators, and power control indicators. In some circumstances, the proximity is based only on a detection of the uplink signal as discussed with reference to FIG. 7. The particular factors and calculation techniques depend on the type of communication system 100.

At step 908, it is determined whether the communication device 108 is close enough to the detecting base station 104 to justify transmitting the pilot signal 112. The calculated proximity is compared to the threshold. In the exemplary embodiment, the proximity is determined to be less than the proximity threshold if the detection signal is detected. If the proximity is less than the threshold, the method continues at step 909. If the proximity is above or equal to the threshold, the method returns to step 902

At step 909, a determination is made whether the detection signal is from a first WCD attempting to connect to the base station 104. If no other WCDs are connected to the base station 104, the detected WCD is the first WCD and the method proceeds to step 910; otherwise the method proceeds to step 956. In step 956, if there are one or more WCDs already connected to the base station 104, for second or subsequent WCDs attempting to connect to the base station 104, the pilot signal power level is increased from a reduced power level to a nominal power level, as discussed further in connection with FIGS. 10-11.

At step 910, for a first detected WCD to attempt connection to the base station 104, the transmission of the pilot signal simply involves turning on the pilot signal. The pilot signal power level may then be subsequently reduced for the first WCD, as discussed below in connection with FIGS. 10-11.

In some circumstances, step 910 may be omitted and the base station 104 may send proximity information to the core network with other information to allow the system 100 to make the determination of whether a communication device 108 should acquire service from the detecting base station 104 and whether the detecting base station 104 should transmit (or increase the power of the pilot signal.

At step 912, it is determined whether the base station 104 is providing service to any WCDs. If at least one wireless device 108 is communicating with the base station 104, the method returns to step 910 to continue transmitting the pilot signal. If no WCDs 108 are communicating with the base station 104, the base station 104 stops transmitting the pilot signal at step 914 and returns to step 902.

As discussed above, providing wireless service includes providing communication service to devices 108 in active states as well as providing other services to devices in idle states such as, for example, registration and administrative related services. Accordingly, the detecting base station determines whether any wireless communication devices 108 are in active state and communicating with the detecting base station and also determines if any devices are in the idle state. If the detecting base station determines that there are no active devices 108 within the cell, the base station 104 determines whether any idle devices 108 may still be within the cell. The detecting base station may use any of several methods to determine if devices 108 in the idle state are still within range of the detecting base station 104. One suitable example includes a requiring a time-based registration from idle devices where the wireless communication device 108 periodically registers with the detecting base station. If the detecting base station determines that no idle devices are registering, the wireless communication device determines that no devices are receiving wireless service. Another suitable example includes receiving a message from the core network indicating that wireless communication device 108 has registered with another base station such as the originating base station 106, for example. If all previously registered devices are determined to have migrated to other base stations based on the core network messages, the detecting base station 104 determines that no communication devices are receiving wireless service. Another suitable example includes including a request and acknowledgement messaging arrangement where the detecting base station 104 periodically sends an Order Message to devices that may be in an idle state. If no acknowledgement message is received, the detecting base station determines that the device 108 is not longer in the cell. If no previously detected devices 108 are determined to be still within the cell, the detecting base station 104 determines that no wireless communication devices 108 are receiving wireless service and the method continues at step 914 where pilot signal is turned off.

Figure 10:
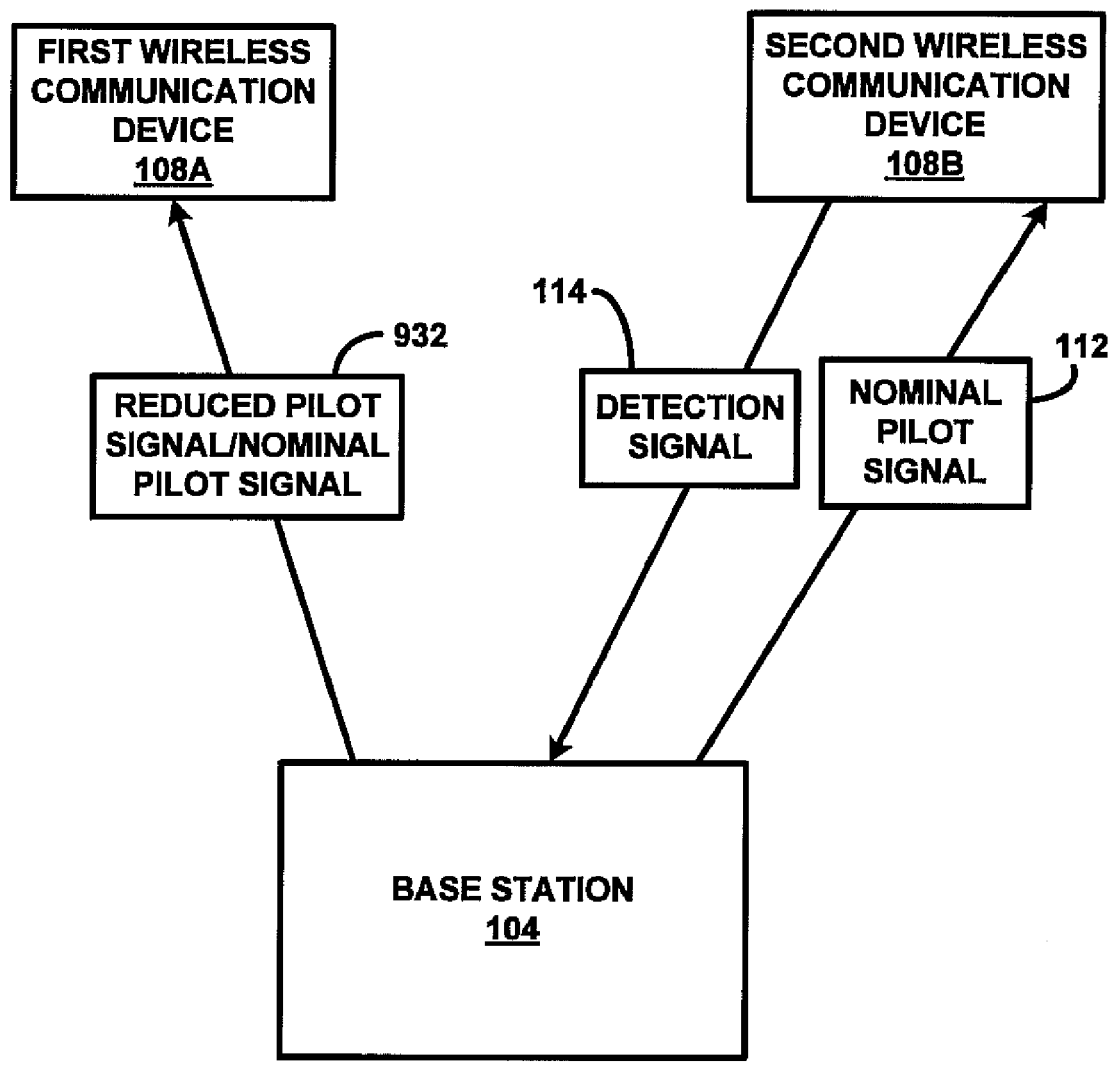
FIG. 10 is a block diagram of the communication system illustrating the scenario where a second authorized WCD comes within range of the detecting base station.
Figure 11:
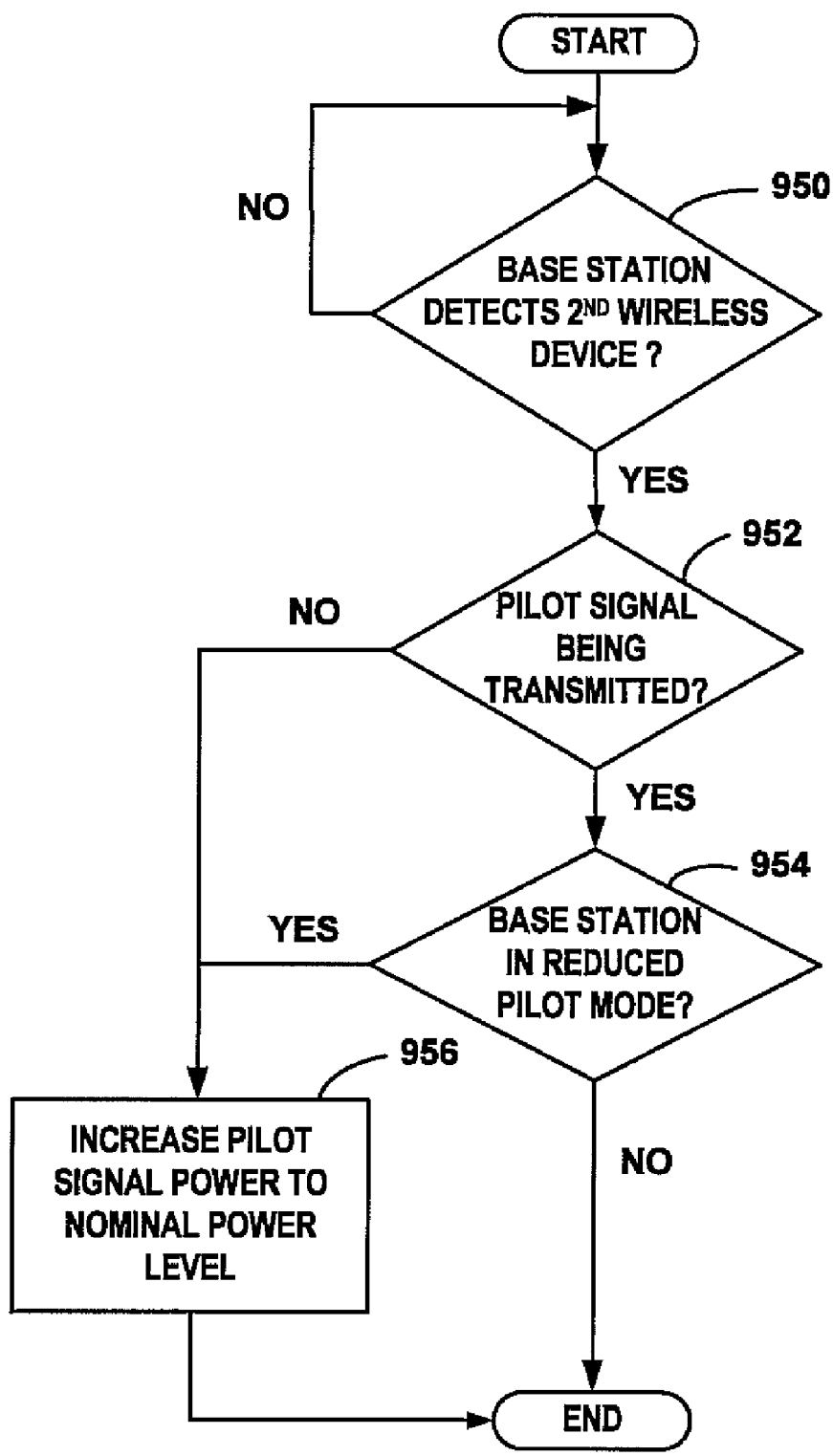
FIG. 11 is a flow chart of a method of managing transmission of the pilot signal when the second authorized WCD is detected.

FIGS. 10-11 describe scenarios of managing the transmission of pilot signals when a second or subsequent authorized WCD comes within range of the detecting base station 104, while the base station 104 is already providing communication services to one or more WCDs, including the first WCD.

FIG. 10 is a block diagram of the communication system illustrating the scenario where a second authorized WCD 108b comes within range of the detecting base station 104, while the base station 104 is providing communication services to a first WCD 108a. In this situation, the first WCD 108a has an active call being handled by the base station 104. The first and second WCDs 108a, 108b each include all of the features and functions disclosed herein for WCD 108. Each of the WCDs 108a, 108b may be detected and connected to the base station 104 as described above.

This scenario addresses the case when the base station 104 has already detected the presence of a first authorized WCD 108a and is serving the first WCD 108a in the connected state (active call state). The communication pilot signal 932 is not turned off, but reduced in power to minimize interference with the macrocell network of the communication system. The extent of the reduction in pilot signal power will depend upon the air link quality between the base station 104 and the first WCD 108a. The higher the air link quality, the greater the reduction in pilot power. The air link quality may be based upon measured pathloss, interference or a combination thereof, and/or the received signal quality at the first WCD 108a. The less pathloss and interference, the greater the reduction in pilot signal power. Conversely, the lower the received signal quality at the first WCD 108a, the less reduction in pilot signal power.

However, the reduction in pilot signal power level also means the coverage footprint of the base station 104 is also reduced. When the second WCD 108b enters the zone served by the base station 104, the second WCD 108b may not be able to operate on the base station 104 due to the reduced pilot signal power level. Indeed, the second WCD 108b may end up in a coverage hole where neither the base station 104 nor the macrocell base station 106 is available to the second WCD 106.

To prevent this, the base station 104 returns its communication pilot signal to nominal signal strength when the second WCD 108*b* or a subsequent WCD is detected by the base station 104. The nominal signal strength may be a preset value or it may depend upon certain operating conditions. For example, the nominal pilot signal strength may be a nominal acquisition power level, or it may be the pilot signal's power level normally transmitted when connecting the first WCD to the detecting base station 104. Returning the pilot signal to nominal strength permits the second WCD 108*b* to connect to the base station 104. Upon successfully connecting to the first and second WCDs 108*a*, 108*b*, the base station 104 may again reduce the pilot signal's power level to reduce interference with other base stations or devices. The process of cycling the pilot signal power level may be repeated for additional WCDs entering the base station's 104 service area.

Details of the operation of the base station 104 in this situation are as follows. The wireless interface of the base station 104 provides services to the first WCD 108*a* using a communication pilot signal emitted from the base station 104 at a reduced power level. In the reduced pilot mode, the WCD detector 122 detects the second WCD 108*b* within the base station 104 service area using any of the detection techniques described above. For example, steps 702-704 of FIG. 7, steps 802-804 of FIG. 8 and/or steps 902-908 of FIG. 9 may be used to detect the second WCD 108*b*. Upon detecting the second WCD 108, the controller 616 increases the pilot signal's power level above the reduced power level in order to establish communications with the second WCD 108*b*. Typically, the controller 616 returns the communication pilot signal's power level to nominal strength.

The reduced pilot mode is a mode whereby the communication pilot signal power of the base station 104 is reduced while the base station 104 serving one or more authorized WCDs in the connected state, in order to minimize interference. The amount of power reduction depends on the quality of the air link between the between the base station 104 and the authorized WCDs. The better the quality of the air link, the greater the potential reduction in communication pilot signal.

FIG. 11 is a flow chart of a method of managing transmission of the pilot signal emitted from the base station 104 when the second authorized WCD 108*b* is detected. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 616 in the detecting base station 104.

In step 950, the base station 104 detects the second WCD 108*b*. The second WCD 108*b* can be detected by the WCD detector 122 using any of the detection techniques disclosed herein, as discussed above. For example, steps 702-704 of FIG. 7, steps 802-804 of FIG. 8 and/or steps 902-908 of FIG. 9 may be used to detect the second WCD 108*b*. If the second WCD 108*b* is detected, the method proceeds to step 952, otherwise, the base station 104 continues to monitor for any additional WCDs that may enter its service zone.

In step 952, the base station controller 616 checks to determine whether the communication pilot signal is currently being transmitted. If so, this indicates that the base station 104 is currently servicing the first WCD 108*b*. If the pilot signal is not on, the method proceeds to step 956, and the controller 616 causes the base station's communication pilot signal power to increase to nominal strength. If the pilot signal is already being transmitted, the controller 616 checks to determine whether the base station 104 is operating in reduced pilot mode (step 954).

If the base station 104 is operating in reduced pilot mode, the controller 616 causes the pilot signal's power level to increase to the nominal power level (step 956). Otherwise, the method terminates.

In step 956, before returning the pilot signal to nominal signal strength, the transmit (Tx) power level of the first WCD 108*a* may need to be adjusted to prevent losing the connection with the first WCD 108*a*. In this step, the BS 104 is trying to maintain the first WCDs Tx power level to be a constant, or at least to minimize Tx power reduction and variation due to the change in pilot signal power level. Without Tx power adjustments, returning the pilot signal to nominal strength can disrupt the reverse link between the first WCD 108*a* and the BS 104. Since the open loop estimate is part of the reverse power control, ramping up the forward pilot power too quickly may cause the reverse link power (the first WCD's Tx power) to be reduced substantially and operate at an undesired operating point. Although the closed loop power control for the first WCD 108*a* will eventually adjust the reverse link power to the proper operating level, this disruption should be avoided. To prevent this disruption, the controller 616 is configured to return the base station's pilot signal power to nominal signal strength incrementally over a short period of time so that the reverse closed loop power control is able to correct the changes without any undue disruption. Alternatively, the base station controller 616 may be configured to cause the base station 104 to issue consecutive "up" power control commands to the first WCD 108*a*, prior to returning the pilot signal to nominal signal strength as a proactive measure. The up power control commands may be transmitted to the first WCD 108*a* in the power control sub-channel of the traffic channel.

Other embodiments and modifications of this invention will occur readily to those of ordinary skill in the art in view of these teachings. The above description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their full scope of equivalents.

What is claimed is:

1. A base station, comprising:
    a wireless interface configured to provide wireless communication services to a first wireless communication device using a pilot signal emitted from the base station at a reduced power level lower than a nominal power level of the pilot signal;
    a detector configured to detect a second wireless communication device within an area served by the base station; and
    a controller configured to increase the pilot signal's power level above the reduced power level in response to detecting the second wireless communication device.

2. The base station of claim 1, wherein the reduced power level is set to minimize interference with devices other than the first and second wireless communication devices.

3. The base station of claim 1, wherein the controller is configured to incrementally increase the pilot signal's power level over a predetermined time period.

4. The base station of claim 1, wherein the controller is further configured to determine whether the second wireless communication device is authorized to receive services from the base station.

5. A base station comprising:
a wireless interface configured to provide wireless communication services to a first wireless communication device using a pilot signal emitted from the base station at a predetermined power level;
a detector configured to detect a second wireless communication device within an area served by the base station;
a controller configured to increase the pilot signal's power level above the predetermined power level in response to detecting the second wireless communication device; and
a transmitter configured to transmit one or more power control commands to the first wireless communication device after detecting the second wireless communication device.

6. The base station of claim 5, wherein the power control commands instruct the first wireless communication device to maintain its transmit power level.

7. The base station of claim 6, wherein the power control commands occur prior to the base station increasing the power level of the pilot signal.

8. A femtocell base station comprising:
a wireless interface configured to provide wireless communication services to a first wireless communication device using a pilot signal emitted from the femtocell base station at a predetermined power level;
a detector configured to detect a second wireless communication device within an area served by the femtocell base station; and
a controller configured to increase the pilot signal's power level above the predetermined power level in response to detecting the second wireless communication device.

9. A base station comprising:
a wireless interface configured to provide wireless communication services to a first wireless communication device using a pilot signal emitted from the base station at a predetermined power level, the predetermined power level based on a quality of an air link between the base station and the first wireless communication device;
a detector configured to detect a second wireless communication device within an area served by the base station; and
a controller configured to increase the pilot signal's power level above the predetermined power level in response to detecting the second wireless communication device.

10. The femtocell base station of claim 9, wherein the predetermined power level is a reduced power level that is lower than a nominal power level of the pilot signal.

11. A method of managing pilot signal transmission from a base station, the method comprising:
serving a first wireless communication device using a pilot signal emitted from the base station at a predetermined power level;
receiving an uplink communication signal transmitted from the second wireless communication device to another base station to detect detecting a second wireless communication device within an area served by the base station; and
increasing the pilot signal's power level above the predetermined power level in response to detecting the second wireless communication device.

12. The method of claim 11, further comprising:
decoding the uplink communication signal using a long code mask corresponding to the second wireless communication device, wherein the uplink communication signal is detected when the uplink signal is successfully decoded.

13. The method of claim 11, wherein the pilot signal is a communication pilot signal.

14. The method of claim 11, wherein increasing includes:
incrementally increasing the pilot signal's power level over a predetermined time period.

15. A method of managing pilot signal transmission from a base station, the method comprising:
serving a first wireless communication device using a pilot signal emitted from the base station at a reduced power level that is lower than a nominal power level of the pilot signal;
detecting a second wireless communication device within an area served by the base station; and
increasing the pilot signal's power level above the reduced power level in response to detecting the second wireless communication device.

16. The method of claim 15, further comprising: receiving a detection signal transmitted from the second wireless communication device.

17. The method of claim 16, wherein the detection signal is an uplink communication signal transmitted to another base station.

18. The method of claim 15, further comprising:
setting the reduced power level to minimize interference with devices other than the first and second wireless communication devices.

19. A method of managing pilot signal transmission from a base station, the method comprising:
serving a first wireless communication device using a pilot signal emitted from the base station at a predetermined power level;
detecting a second wireless communication device within an area served by the base station;
increasing the pilot signal's power level above the predetermined power level in response to detecting the second wireless communication device; and
transmitting one or more power control commands to the first wireless communication device after detecting the second wireless communication device and prior to increasing the pilot signal's power level.

20. The method of claim 19, wherein transmitting the power control commands occurs prior to the base station increasing the power level of the pilot signal.

* * * * *

UNITED STATES PATENT AND TRADEMARK OFFICE
CERTIFICATE OF CORRECTION

| | | |
|---|---|---|
| PATENT NO. | : 8,165,577 B2 | Page 1 of 1 |
| APPLICATION NO. | : 12/407707 | |
| DATED | : April 24, 2012 | |
| INVENTOR(S) | : Henry Chang and Doug Dunn | |

It is certified that error appears in the above-identified patent and that said Letters Patent is hereby corrected as shown below:

Column 18,
Line 1, delete "to detect detecting a second wireless" and replace with -- to detect a second wireless --

Signed and Sealed this
Thirty-first Day of July, 2012

David J. Kappos
*Director of the United States Patent and Trademark Office*